US008845936B2

(12) United States Patent  (10) Patent No.: US 8,845,936 B2
Yang et al.  (45) Date of Patent: Sep. 30, 2014

(54) PROCESS AND DEVICE FOR THE PREPARATION OF HOLLOW MICROSPHERES COMPRISING CENTRIFUGAL ATOMIZATION

(75) Inventors: Jinlong Yang, Beijing (CN); Kai Cai, Beijing (CN); Xiaoqing Xi, Beijing (CN); Guojun Ge, Handan (CN); Yong Huang, Beijing (CN)

(73) Assignee: Hebei YL-Bangda New Materials Limited Company, Handan, Hebei (CN)

( * ) Notice: Subject to any disclaimer, the term of this patent is extended or adjusted under 35 U.S.C. 154(b) by 270 days.

(21) Appl. No.: 13/265,463

(22) PCT Filed: Apr. 20, 2010

(86) PCT No.: PCT/CN2010/000538
§ 371 (c)(1),
(2), (4) Date: Jan. 11, 2012

(87) PCT Pub. No.: WO2010/121488
PCT Pub. Date: Oct. 28, 2010

(65) Prior Publication Data
US 2012/0107611 A1  May 3, 2012

(30) Foreign Application Priority Data

Apr. 21, 2009 (CN) .......................... 2009 1 0131051

(51) Int. Cl.
B29B 9/00 (2006.01)
B29C 44/54 (2006.01)
(Continued)

(52) U.S. Cl.
CPC ............ *C04B 20/002* (2013.01); *C01B 13/145* (2013.01); *C01P 2004/61* (2013.01);
(Continued)

(58) Field of Classification Search
USPC ....................... 264/12, 42, 51, 632
See application file for complete search history.

(56) References Cited

U.S. PATENT DOCUMENTS 5,384,290 A * 1/1995 Brezny ............................ 501/81

FOREIGN PATENT DOCUMENTS

CN 1113922 12/1995
CN 1123772 6/1996
(Continued)

OTHER PUBLICATIONS

Machine translation copy of JP 2007-152178 (2007).*

(Continued)

*Primary Examiner* — Holly Le
(74) *Attorney, Agent, or Firm* — Pillsbury Winthrop Shaw Pittman, LLP

(57) ABSTRACT

A process for preparing hollow ceramic or metal microspheres, comprising the steps of: forming ceramic or metal slurry, comprising ceramic or metal powders, water and dispersant and having a certain solid phase content, into a stable foam slurry by using a foaming agent; introducing the stable foam slurry into a centrifugal atomization equipment to atomize it into hollow slurry droplets, while being sprayed into a molding chamber; drying rapidly to form hollow microsphere green body; collecting the hollow microsphere green body and sintering. The hollow microsphere prepared has a particle size of 0.001-1.5 mm and high quality and low cost. The process is adapted to produce various inorganic material powders into hollow microspheres. The present invention also provides a device for preparing hollow ceramic or metal microspheres and hollow microspheres.

3 Claims, 3 Drawing Sheets

(51) Int. Cl.
*B29C 44/58* (2006.01)
*C04B 38/10* (2006.01)
*C01B 13/14* (2006.01)
*B22F 9/08* (2006.01)
*B01J 13/04* (2006.01)
*C04B 38/00* (2006.01)
*C04B 20/00* (2006.01)
*C01B 21/068* (2006.01)
*C09C 3/00* (2006.01)
*C04B 35/622* (2006.01)
*C09C 3/04* (2006.01)
*B22F 1/00* (2006.01)
*C09C 1/40* (2006.01)
*C01F 7/02* (2006.01)

(52) U.S. Cl.
CPC ............... *B22F 9/082* (2013.01); *B01J 13/043* (2013.01); *B22F 2009/0888* (2013.01); *C04B 38/009* (2013.01); *C01B 21/0687* (2013.01); *B22F 2999/00* (2013.01); *C01P 2004/03* (2013.01); *C01P 2004/34* (2013.01); *C09C 3/00* (2013.01); *C04B 35/622* (2013.01); *C09C 3/04* (2013.01); *B22F 1/0051* (2013.01); *C09C 1/407* (2013.01); *C01F 7/021* (2013.01)

USPC .................. 264/12; 264/42; 264/51; 264/632

(56) References Cited

FOREIGN PATENT DOCUMENTS

| | | |
|---|---|---|
| CN | 2582742 Y | 10/2003 |
| CN | 2931473 | 8/2007 |
| CN | 2931473 Y | 8/2007 |
| JP | 02-064016 | 3/1990 |
| JP | 2002-029764 A | 1/2002 |
| JP | 2007-152178 A | 6/2007 |
| WO | WO 02/48637 A1 | 6/2002 |
| WO | WO 2007/002744 A2 | 1/2007 |

OTHER PUBLICATIONS

International Search Report for PCT/CN2010/000538.
Cheng, Xiaosu et al.; "Study on Prepareation Technology and Properties of Ceramic Microspheres"; The Chinese Jornal of process Engineering; Aug. 2004, vol. 4, Supplement, pp. 291-296.
Eurasian Office Action date Aug. 22, 2013 for Appln. No. 201171263.
Patent Examination Report issued in corresponding Australian Patent Application No. 2010239045, dated Sep. 29, 2012.

* cited by examiner

PROCESS AND DEVICE FOR THE PREPARATION OF HOLLOW MICROSPHERES COMPRISING CENTRIFUGAL ATOMIZATION

CROSS REFERENCE TO RELATED APPLICATIONS

This application is the U.S. National Stage of PCT/CN2010/000538, filed Apr. 20, 2010, which in turn claims priority to Chinese Patent Application No. 200910131051.7, filed Apr. 21, 2009, the entire contents of all applications are incorporated herein by reference in their entireties.

TECHNICAL FIELD

The present invention relates to the technical field of molding of materials, particularly to provide hollow ceramics or metallic microspheres, and a process and device for preparing hollow ceramic or metallic microspheres.

BACKGROUND ART

Hollow ceramic microspheres are hollow inorganic non-metallic spheres in small size, with a particle diameter ranging from 0.01 to 1.0 mm. They have the advantages of light weight, low heat conductivity, sound insulation, wear resistance, high dispersion, good electric insulation and good heat stability, with low manufacture cost, being novel light materials having light weight, high strength, and excellent properties with diversified uses. They can meet the requirements of petroleum cementing, automobile chassis shock-resistance, hull deck, fillers for organics including resins etc, emulsion explosive, high-quality fire-resistant coating, heat insulating refractory material, building interlayer heat insulation, sound absorption and noise taming, heat insulation and energy saving of building exterior wall, regression reflection materials, carriers of release-controlled drugs in biological pharmaceutical preparation, and can also be potentially used as light packaging materials of electronic industry, wave absorption materials, deep water floatation materials, low density adhesives, light weight and high strength concretes. As compared to traditional hollow glass microspheres, the hollow ceramic microspheres have higher compressive strength, which can be tens of times higher than the former one.

In the preparing of artificial marbles, hollow ceramic microspheres are used to reduce the weight of articles and improve the anti-cracking ability of articles. Hollow ceramic microspheres are used to manufacture synthetic woods, with the products having the same visual sense, appearance and structure as woods. They are mainly used for the fabrication of high-quality furniture, sanitary ware, furniture casts, and decorative boards et al.

Hollow ceramic microspheres are used as composite materials for repairing. The typical application is that hollow glass microspheres are added to resins to replace part of the fillers like calcium carbonate, talcum powder, etc, to prepare lime putty (putty). This novel lime putty has the advantages of light weight, strong adhesion, easy application, low shrinkage, and short curing time, particularly significantly improving the performance of foundry milling and polishing properties. They have been widely used in the repairing of various vehicles, shipping, and machine tools.

Hollow ceramic microspheres can be hollow spheres containing an amount of gases inside, with low thermal conductivity. Thus, hollow glass microspheres have the features of sound insulation and heat insulation, and therefore are good fillers of various heat insulating materials and sound insulating materials. Meanwhile, the hollow ceramic microspheres have been widely used in heat insulation materials.

Besides, hollow ceramic microspheres are also excellent sensitizers of emulsion explosives, can improve the sensitivity of emulsion explosives and prolonging the shelf time of explosives.

Existing hollow ceramic microspheres particularly mean hollow microspheres or hollow floating beads consisting of silicon dioxide ($SiO_2$) and aluminum oxide ($Al_2O_3$), which are obtained by grading process, e.g. flotation, from fly ash or coal gangue. The hollow ceramic microspheres are actually micro- or sub-micro-size glass microspheres having a hollow structure and a shell of aluminosilicate glass, and are widely used in inks, binders, engineering plastics, modified rubbers, electrical appliance insulators. However, hollow ceramic microspheres other than aluminosilicates glass are difficult to be similarly prepared by this process at present.

Additionally, researchers have prepared hollow microspheres of other materials, such as $TiO_2$ (Zhang Junling, et al, CN101580275A), ZnO (Xu Zhibing et al, CN1807254A), CdS (Xie Rongguo, et al, CN1559911A), $Fe_3O_4$ (Nie Zuoren, et al., CN101475223A), $SiO_2$ (Yin Hengbo, et al., CN101559951A). However, these methods are restricted by the process and basically limited to prepare hollow microspheres with specific composition that can be obtained by solution chemical process, but difficult to be used for the preparation of hollow microspheres other than those with specific components.

The applicant has successfully prepared hollow microspheres of varies materials such as $Al_2O_3$, $ZrO_2$, $Si_3N_4$, SiC, coal gangue, fly ash, WC, Ni etc, by preparing stable foam slurry and using centrifugal atomization process. One of the key steps used in the process is centrifugal atomization. Centrifugal atomization is one of commonly used atomization techniques. This process results in greater cooling rate than gas atomization process. At present, centrifugal atomization process is used to produce metal powders or rapid-solidified alloy powders, in which process, the metal is heated and melted, and spinned-out and crushed into droplets under centrifugal force, and then cooled by liquid nitrogen to solidify it into powders. The microcrystalline powders manufactured by the process have very fine texture and small segregation with low cost, and can be easily produced in industrial scale. In the present invention, centrifugal atomization technique is used, for the first time, in the manufacture of ceramic hollow microspheres. Aqueous or non-aqueous slurries having certain characteristics (highly-stable foams having a certain solid phase content) are prepared, the foam slurries are atomized by centrifugal atomization to form hollow slurry droplets, the hollow slurry droplets are dried rapidly to obtain ceramic hollow microspheres. This is the first time that this technique is successfully used in ceramic systems and solid wastes containing inorganic non-metallic materials, broadening the application scopes and application prospects of hollow microspheres, and providing new approach to recycle solid wastes. At the meantime, this technique is also successfully used in the preparation of hollow microspheres of metals and alloy materials.

The process and device are versatile to ceramic powders of various material systems and can be used for the production of hollow microspheres of various ceramic materials (e.g., $Al_2O_3$, $ZrO_2$, $Si_3N_4$, SiC etc.), solid wastes containing inorganic non-metallic materials (e.g., coal gangue, fly ash), and various metal and alloy material systems (e.g., WC, Ni, etc.). The hollow microspheres have a diameter of 0.001-1.5 mm, including closed-cell hollow microspheres and open-cell hollow microspheres. The open-cell or closed-cell hollow microspheres of this material system having a diameter of 0.001-1.5 mm have not been reported.

SUMMARY OF THE INVENTION

The present invention provides hollow ceramic or metal microspheres, and a process and device for the preparation of hollow ceramic or metal microspheres. The process and device are adapted to ceramics or metal powders of various material systems and can be used to prepare hollow microspheres of various inorganic non-metallic materials, for example, including: oxide and non-oxide ceramics, solid wastes such as coal gangue, fly ash, tailings, sludge, waste stones, and metal or alloy materials. The process is simple in operation. Feedstock powders are directly prepared into foam stable slurry having a certain amount of solid phase, to prepare target hollow microspheres. This process is versatile to various raw materials and has no restriction of application. Hollow microspheres which are difficult to be prepared by other processes have been successfully produced by the process of the invention.

In some embodiments, the present invention provides hollow ceramic or metal microspheres. Said microspheres have a diameter of 0.001-1.5 mm. In some embodiments, the hollow microspheres have a diameter of more than 1 micron, such as 1-100 microns, or 500-1500 microns, and contain components other than aluminum silicate, such as high-temperature (heat-resistant) ceramics and high-temperature (heat-resistant) metals/alloys selected from non-oxides, or selected from non-oxide ceramics, carbides. In some embodiments, hollow ceramic microspheres consist of components selected from the group consisting of $ZrO_2$, $Si_3N_4$, WC, SiC. In some embodiments, hollow ceramic microspheres have open holes on the surface.

In some embodiments, the present invention provides a process for the preparation of hollow ceramic or metal microspheres, comprising the steps of: forming ceramic or metal slurry, comprising ceramic or metal powders, water and dispersant and having a certain solid phase content, into stable foam slurry by using a foaming agent; providing the stable foam slurry into centrifugal atomization device to atomize into hollow slurry droplets, and being sprayed into molding chamber, drying rapidly to form hollow microsphere green body; collecting the hollow microsphere green body and sintering. In some embodiments of the production process according to the invention, ceramic or metal powders are mixed with water and dispersant and ball-milled to obtain ceramic or metal slurry having a certain solid phase content. In some embodiments, foaming agent is added into the ceramic or metal slurry having a certain solid phase content, and the slurry is stirred sufficiently to prepare into stable foam slurry. In the present invention, solid phase content means the volume content of solid (ceramic or metal) powders in the slurry, typically ranging between 5 and 60%.

In the present invention, stable foam slurry means that the foam slurry remain stable during a fairly long period of time, e.g., at least 6 hours, generally 1-3 days, without apparent aggregation or sedimentation of solid particles, and without antifoaming or foam joining of foam in the slurry. The stable foam slurry could be obtained by appropriate action of dispersant and foaming agent. The particles are retained to be stably dispersed in a solution by steric hindrance effect and electrostatic effect of dispersant. The foaming effect of foaming agent should be mainly considered to allow the foaming rate of the slurry between 20% and 600% and the diameter of air bubble between 0.001 mm and 1.5 mm, without apparent antifoaming or foam joining phenomenon for 1-10 days shelf time. The foaming rate is defined to be the volume ratio of foamed slurry to un-foamed slurry. When foaming effect is bad, e.g., foaming rate is low, or foam is unstable to cause foam joining or antifoaming, and the hollow rate and the diameter of microspheres of final hollow microspheres will be influenced. The diameter of air bubble can be adjusted via addition amount of foaming agent and the stirring or ball milling time after the addition of foaming agent. The droplets after centrifugal atomization should be dried instantly to keep and fix their shape. If the drying rate is not rapid enough, the droplets will deform under gravity or blowing force.

In some embodiments, ceramic or metal slurry having a certain solid phase content can be obtained by mixing powders with water and dispersant, and ball-milling. Among others, the ceramic powders can be raw materials of various ceramic materials. The raw materials can be selected from general inorganic non-metallic material powders, such as oxide powders, non-oxide ceramic powders, and solid wastes containing inorganic non-metal materials such as coal gangue, fly ash, tailings, sludge, as well as loess powders, and metal or alloy powders can also be used. Some specific examples include $ZrO_2$, $Si_3N_4$, SiC, coal gangue, fly ash, WC, Ni, etc.

With regarding to dispersant, the present invention does not depend upon the selection of specific dispersant, provided that the dispersant can cause appropriate dispersion of ceramic powder in the slurry. Some examples of dispersants are ammonium polyacrylate, tetramethyl ammonium hydroxide, ammonium citrate, ammonium polymethacrylate, tetramethylethylene diamine, calgon, etc. To achieve better dispersion effect, dispersants can be correspondingly selected in terms of different powders. For example, ammonium citrate is selected for zirconium oxide powder, and tetramethyl ammonium hydroxide is selected for silicon nitride powder.

With regard to foaming agent, the present invention does not depend on the selection of specific foaming agent, provided that the foaming agent can cause the ceramic slurry having a certain phase solid content forming into stable foam slurry, for example, foaming agents which do not react with powders can be selected. Some examples of useable foaming agents are triton, propyl gallate. In the present invention, the foaming agent has a foaming rate of, preferably, between 20% and 600%; the air bubble has a diameter of between 0.001 mm and 1.5 mm, without apparent antifoaming or foam joining phenomenon for 1-10 days shelf time.

The ratio of ceramic or metal powders to water or dispersants is preferably a ratio to obtain slurry having a certain solid phase content. In some embodiments, the volume of powders is about 5-60% of the total volume of the solution after the addition of powders; the dispersant is about 0.1-3% of the total volume; the foaming agent is about 0.1-1% of the total volume, and balance being water.

In the present invention, ceramic or metal slurries having a certain solid phase content can be obtained by ball-milling process. However, those skilled in the art can understand that slurries having a certain solid phase content can be obtained by other similar processes, for example, mixing by using a mixer. In the present invention, it is not limited to ball-milling process, but any process is feasible as long as ceramic or metal slurry having a certain solid phase content can be obtained.

On the other hand, the present invention provides a device for preparing hollow microspheres. In one embodiment, the diagrammatic sketch of the device is as shown in FIG. 2, comprising centrifugal atomization equipment 1, molding chamber 2, exhaust gas system 4, separation system 3, and hot-blast air system 5 providing hot-blast air for molding chamber. Among others, the centrifugal atomization equipment is located at upper part, with its lower part being connected with the molding chamber. An exhaust gas system is connected to the upper part of the molding chamber, a separation system is arranged below the molding chamber, and the molding chamber is connected with the hot-blast air system. The centrifugal atomization system is the key part of the device. For the centrifugal atomization mechanism and equipments, the description in, e.g. "*Production of Metal Powders by Centrifugal Atomization*" (Wen Shude, "*Heat Treatment of Metals Abroad*", No. 3, 1997) can be referred. Foam slurry can be dispersed via centrifugal atomization system into hollow droplets with a diameter of 0.2-1.5 mm, and sprayed into molding chamber. Air (if desired, other gases, such as inert gas, can be used) is filtered and heated to 80-300° C. by hot-blast air system, and introduced evenly in twist into the molding chamber from the upper part thereof, co-current flowing and contacting with hollow droplets and drying the droplets in a very short time (instantly, generally less than 1 second) to form hollow microsphere green body. The waste gas is exhausted via exhaust gas system. Hollow microsphere green body is continuously output from the separation system at the bottom of the molding chamber. This device has rapid molding rate; the foam slurry is completely dispersed and dried in several seconds, especially suitable for industrial production. The hollow microsphere green body formed by the device has good distribution of particle size. The particle size of the products can be adjusted by altering operation conditions. The product has high strength, the production process is simple with convenient operation control.

The process and device are versatile to powders of various material systems, and can be used to prepare hollow microspheres of various ceramic materials ($Al_2O_3$, $ZrO_2$, $Si_3N_4$, SiC, etc.), of solid wastes containing inorganic non-metal materials (coal gangue, fly ash, etc.), of metal and alloy materials (WC, Ni, etc.). The hollow ceramic microspheres have a diameter of 0.001 mm-1.5 mm, including closed-cell hollow microspheres and open-cell hollow microspheres.

The advantageous effects of the present invention are: the hollow microsphere green body formed by the device has good distribution of particle size; the particle size of the products can be adjusted by altering operation conditions; the product has high strength, the production process is simple with convenient operation control; the hollow ceramic microspheres of various ceramic material systems can be prepared, and the distribution of particle size of the microspheres and the thickness of the wall of hollow microspheres can be adjusted by production process; the process is simple and has high production efficiency, and is suitable for large-scale industrial production.

Figure 1:
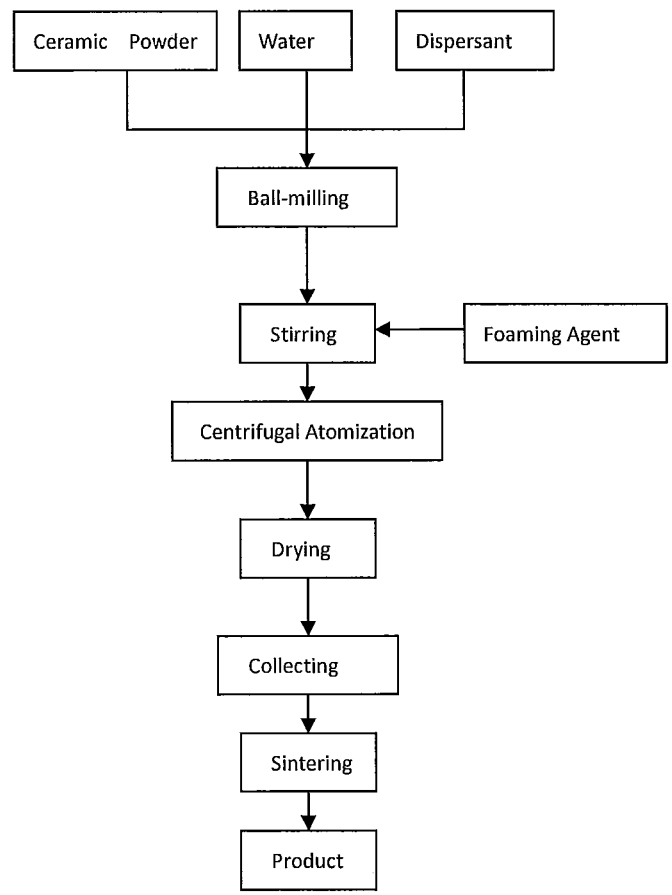
FIG. 1: A flow chart of the process for producing hollow ceramic microspheres according to the present invention.
Figure 2:
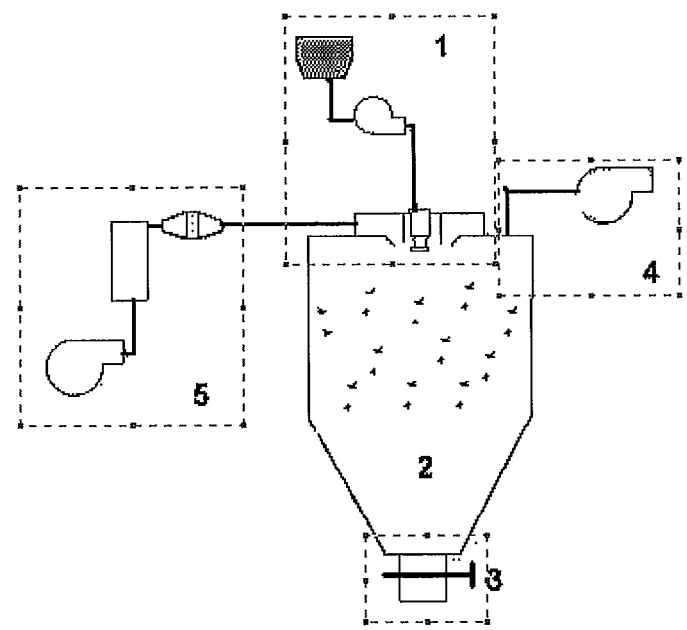
FIG. 2: A diagrammatic drawing of the structure of the device for preparing hollow ceramic microspheres according to the present invention.

The reference numbers in FIG. 2
1. Centrifugal atomization equipment;
2. Molding chamber;
3. Separation system;
4. Exhaust gas system;
5. Hot-blast air system

EMBODIMENTS

Example 1

The Preparation of $al_2O_3$ Hollow Microspheres

The volume ratio of $Al_2O_3$ ceramic powders to water was controlled at 1:3. 0.1 vol. % (based on the total volume) ammonium polyacrylate dispersant was added, followed by mixing and ball-milling to obtain ceramic slurry with 25 vol. % of solid phase content. Propyl gallate foaming agent is added to the ceramic slurry in 0.3 vol. %, followed by stirring sufficiently or ball-milling to prepare the slurry with high solid phase content into a stable foam slurry; the stable foam slurry was introduced into centrifugal atomization equipment via diaphragm pump to atomize into hollow slurry droplets while being sprayed into the molding chamber. The temperature in the molding chamber was 280° C. The slurry droplets were dried instantly to form hollow $Al_2O_3$ microsphere green body; the hollow $Al_2O_3$ microsphere green body was collected, and placed in Si—Mo bar sintering furnace and sintered at 1580° C. to obtain hollow $Al_2O_3$ microspheres. The hollow microspheres have a size of between 10 μm and 200 μm.

Example 2

The Preparation of $ZrO_2$ Hollow Microspheres

The volume ratio of $ZrO_2$ ceramic powders to water was controlled at 1:5. 0.15 vol. % (based on the total volume) ammonium polyacrylate dispersant was added, followed by mixing and ball-milling to obtain ceramic slurry with 16.7 vol. % of solid phase content. Triton X-100 foaming agent was added into the ceramic slurry in 1.5 vol. %, followed by stirring sufficiently to prepare the slurry with high solid phase content into a stable foam slurry. The stable foam slurry was introduced into centrifugal atomization equipment to atomize into hollow slurry droplets while being sprayed into the molding chamber. The temperature in the molding chamber was 280° C. The slurry droplets were dried instantly to form hollow $ZrO_2$ microsphere green body; the hollow $ZrO_2$ microsphere green body was collected, and placed in Si—Mo bar high temperature electric furnace and sintered at 1520° C. to obtain hollow $ZrO_2$ microspheres. The hollow microspheres have a size of between 10 μm and 300 μm.

Example 3

The Preparation of $Si_3N_4$ Hollow Microspheres

Figure 3:
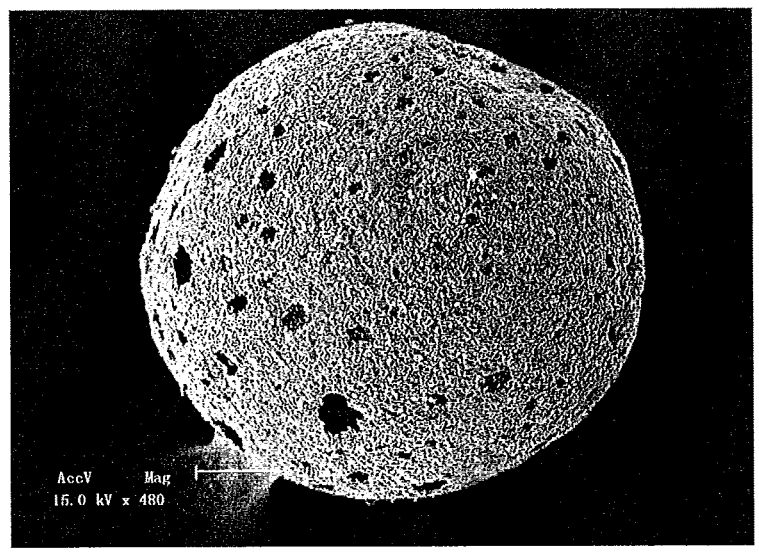
FIG. 3: Microphotograph of open-cell hollow ceramic microspheres of silicon nitride prepared by the present invention.

The volume ratio of $Si_3N_4$ ceramic powders to water was controlled at 1:5. 2 vol. % (based on the total volume) tetramethyl ammonium hydroxide was mixed, followed by mixing and ball-milling to obtain ceramic slurry with 25 vol. % of solid phase content. 0.8 vol. % triton X-114 foaming agent was added into the ceramic slurry, followed by stirring sufficiently to prepare the slurry with high solid phase content into a stable foam slurry; the stable foam slurry was introduced into centrifugal atomization equipment via to atomize into hollow slurry droplets while being sprayed into the molding chamber. The temperature in the molding chamber was 250° C. The slurry droplets were dried instantly to form hollow $Si_3N_4$ microsphere green body; the hollow $Si_3N_4$ microsphere green body was collected, and placed in unpressurized vacuum sintering furnace and sintered at 1780° C. to obtain hollow $Si_3N_4$ microspheres. The appearance of the microspheres was as shown in FIG. 3 (the scale in the figure refers 50 microns). The hollow microspheres have a size of between 10 μm and 300 μm.

Example 4

The Preparation of Gangue Hollow Microspheres

Figure 4:
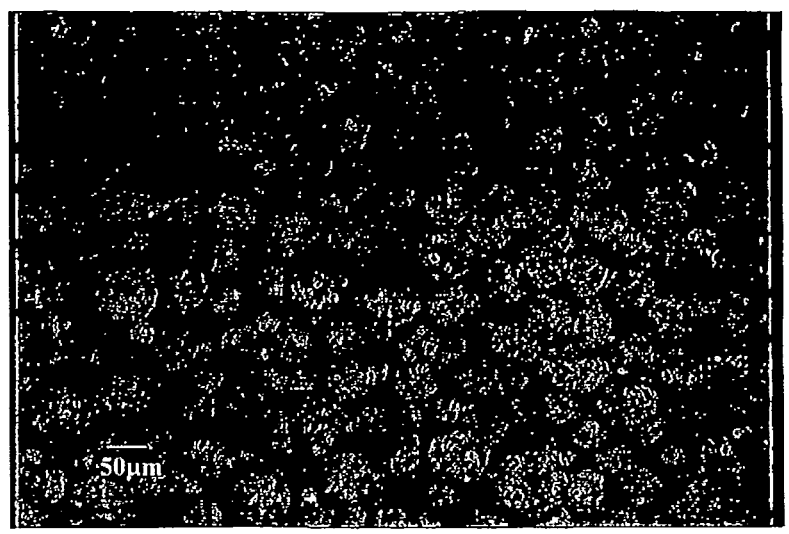
FIG. 4: Microphotograph of hollow ceramic microspheres of coal gangue prepared in the present invention.

The volume ratio of coal gangue powders to water was controlled at 1:4, with 1 vol. % (based on the total volume) ammonium citrate added, followed by mixing and ball-milling to obtain ceramic slurry with 20 vol. % of solid phase content. 1 vol. % triton X-100 foaming agent was added into the ceramic slurry, followed by stirring sufficiently to prepare the slurry into a stable foam slurry; the stable foam slurry was introduced into centrifugal atomization equipment to atomize into hollow slurry droplets while being sprayed into the molding chamber. The temperature in the molding chamber was 200° C. The slurry droplets were dried instantly to form hollow coal gangue microsphere green body; the hollow gangue microsphere green body was collected, and placed in rotary kiln furnace and sintered at 1200° C. to obtain hollow gangue microspheres. The appearance of the microspheres was as shown in FIG. 4 (the scale in the figure refers 50 microns). The hollow microspheres have a size of between 10 μm and 100 μm.

Although the present invention is described above with reference to some embodiments, the present invention is not limited to the embodiments, but can be modified and substituted within the scope of following claims.

The invention claimed is:

1. A process for preparing hollow ceramic or metal microspheres, comprising:
    (1) forming ceramic or metal slurry, comprising ceramic or metal powders, water and dispersant and having a certain solid phase content, into a stable foam slurry by using a foaming agent, said solid phase content being in the range of 5-60% by volume;
    (2) introducing the stable foam slurry into a centrifugal atomization equipment to atomize it into hollow slurry droplets, then spraying the hollow slurry droplets into a molding chamber and drying rapidly in a time of less than 1 second to form hollow microsphere green body; and
    (3) collecting the hollow microsphere green body and sintering;
    wherein, in the ceramic or metal slurry having a certain solid phase content, the volume of said powders is 5-60% of the total volume of the solution after the addition of said powders, the dispersant is 0.1-3% of the total volume, the foaming agent is 0.1-1% of the total volume, and balance being water;
    the dispersant is selected from ammonium citrate, ammonium polymethacrylate, tetramethylethylene diamine, and calgon, and said foaming agent is selected from triton and propyl gallate; and
    the stable foam slurry has a slurry foaming rate of between 20% and 600% and a diameter of air bubble being between 0.001 mm and 1.5 mm, and is substantially without apparent antifoaming or foam joining phenomenon for 1-10 days shelf time.

2. The process as claimed in claim 1, wherein the ceramic or metal powder is selected from oxide ceramic, non-oxide ceramic, coal gangue, fly ash, tailings, sludge, waste stones, and metal/alloy materials.

3. The process as claimed in claim 1, wherein ceramic or metal slurry having certain solid phase contend is prepared by mixing the ceramic or metal powders with water and dispersant and ball-milling; the foaming agent is added to the ceramic or metal slurry having a certain solid content followed by stirring sufficiently to prepare the slurry into a stable foam slurry.

\* \* \* \* \*